(12) United States Patent
He et al.

(10) Patent No.: US 12,737,224 B1
(45) Date of Patent: Sep. 15, 2026

(54) DYNAMIC PARALLELISM MODE SWITCHING FOR OPERATING ARTIFICIAL INTELLIGENCE MODEL

(71) Applicant: Snowflake Inc., Bozeman, MT (US)

(72) Inventors: Yuxiong He, Redmond, WA (US); Mert Hidayetoglu, Palo Alto, CA (US); Aurick Qiao, Pittsburgh, PA (US); Samyam Rajbhandari, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/283,979

(22) Filed: Jul. 29, 2025

(51) Int. Cl.

| | |
|---|---|
| ***G06F 9/50*** | (2006.01) |
| ***G06F 11/34*** | (2006.01) |
| ***G06F 17/16*** | (2006.01) |
| ***G06N 3/02*** | (2006.01) |
| ***G06N 3/098*** | (2023.01) |
| ***G06N 5/04*** | (2023.01) |
| *G06N 20/00* | (2019.01) |

(52) U.S. Cl.
CPC .......... *G06F 9/5011* (2013.01); *G06F 9/5066* (2013.01); *G06F 11/3433* (2013.01); *G06N 3/098* (2023.01); *G06N 5/04* (2013.01); *G06F 17/16* (2013.01); *G06N 3/02* (2013.01); *G06N 20/00* (2019.01)

(58) Field of Classification Search
None
See application file for complete search history.

(56) References Cited

U.S. PATENT DOCUMENTS

2020/0265327 A1* 8/2020 Kwiatkowski ......... G06N 3/084
2022/0383084 A1* 12/2022 Lamy-Poirier ........ G06N 3/063
2022/0414440 A1* 12/2022 Dalli ...................... G06N 3/045
2023/0023101 A1* 1/2023 Su ........................... G06N 3/08
2023/0128271 A1* 4/2023 Liu .......................... G06N 3/063 706/12
2025/0061533 A1* 2/2025 Phanishayee .......... G06N 3/098
(Continued)

FOREIGN PATENT DOCUMENTS

CN 111985629 A * 11/2020 ............. G06N 3/045
CN 118410859 A * 7/2024 ....... G06F 18/23213
(Continued)

OTHER PUBLICATIONS

Model Parallel Training Method And Device (Year: 2024).*
(Continued)

*Primary Examiner* — Abu Zar Ghaffari
(74) *Attorney, Agent, or Firm* — Schwegman Lundberg & Woessner, P.A.

(57) ABSTRACT

Various example embodiments described herein provide for systems, methods, devices, instructions, and the like that performs inference operations on an individual AI model using dynamically selected parallelism, where the parallelism selection can be based on one or more computational workload conditions associated with the individual AI model. For example, the AI model system of some example embodiments switches between two or more different parallelism modes of operation with respect to an individual AI model based on one or more inference request patterns or based on one or more batch characteristics of a set of inference requests received by the AI model system.

30 Claims, 6 Drawing Sheets

(56) References Cited

U.S. PATENT DOCUMENTS

| | | | | |
|---|---|---|---|---|
| 2025/0106306 | A1* | 3/2025 | Hart | G06F 9/5072 |
| 2025/0131239 | A1* | 4/2025 | Gokhale | G06N 10/60 |
| 2025/0165804 | A1* | 5/2025 | Rhu | G06N 3/098 |
| 2025/0200695 | A1* | 6/2025 | An | G06N 3/08 |
| 2025/0370802 | A1* | 12/2025 | Kang | G06F 9/3867 |
| 2025/0384312 | A1* | 12/2025 | Seth | G06F 9/5094 |
| 2026/0080186 | A1* | 3/2026 | Ming | G06F 40/40 |

FOREIGN PATENT DOCUMENTS

| | | | | |
|---|---|---|---|---|
| CN | 118605948 A | * 9/2024 | | G06F 9/38 |
| CN | 118780393 A | * 10/2024 | | G06N 5/04 |
| CN | 119026694 A | * 11/2024 | | G06N 3/0495 |

OTHER PUBLICATIONS

"Arctic Inference with Shift Parallelism The Fastest Open Source Inference System for Enterprise AI", [Online]. Retrieved from the Internet: URL: https: www.snowflake.com en engineering-blog arctic-inference-shift-parallelism , (May 29, 2025), 29 pgs.

"BAAI bge base en v1.5 Hugging Face", [Online]. Retrieved from the Internet: URL: https: web.archive. org web 20250517001824 https: huggingface.co BAAI bge-base-en-v1.5, (accessed on May 17, 2025), 18 pgs.

"GitHub snowflakedb ArcticInference ArcticInference vLLM plugin for high throughput low latency inference", [Online]. Retrieved from the Internet: URL: https: github.com snowflakedb ArcticInference tree main, (accessed on Aug. 21, 2025), 5 pgs.

"SwiftKV Accelerating Enterprise LLM Workloads with Knowledge Preserving Compute Reduction", [Online]. Retrieved from the Internet: URL: https: www.snowflake.com en engineering-blog swiftkv-llm-compute-reduction , (Dec. 5, 2024), 29 pgs.

"Scaling vLLM for Embeddings 16x Throughput and Cost Reduction", [Online]. Retrieved from the Internet: URL: https: www. snowflake.com en engineering-blog embedding-inference-arctic-16x-faster , (May 29, 2025), 17 pgs.

"Low Latency and High Throughput Inference for Long Context with Sequence Parallelism aka Arctic Ulysses", [Online]. Retrieved from the Internet: URL: https: www.snowflake.com en engineering-blog ulysses-low-latency-llm-inference , (Apr. 3, 2025), 24 pgs.

"Arctic embed a Snowflake Collection", [Online]. Retrieved from the Internet: URL: https: huggingface.co collections Snowflake arctic-embed-661fd57d50fab5fc314e4c18, (Dec. 5, 2024), 2 pgs.

Qiao, Aurick, "SwiftKV Fast Prefill Optimized Inference with Knowledge Preserving Model Transformation", arXiv:2410.03960, (Oct. 4, 2024), 19 pgs.

Rasley, Jeff, "ArcticInference projects ulysses at main snowflakedb ArcticInference GitHub", [Online]. Retrieved from the Internet: URL: https: github.com snowflakedb ArcticInference tree main projects ulysses, (Accessed on Jul. 17, 2025), 2 pgs.

Wang, Ye, "Fastest Speculative Decoding in vLLM with Arctic Inference and Arctic Training", [Online]. Retrieved from the Internet: URL: https: www.snowflake.com en engineering-blog fast-speculative-decoding-vllm-arctic , (May 1, 2025), 32 pgs.

* cited by examiner

DYNAMIC PARALLELISM MODE SWITCHING FOR OPERATING ARTIFICIAL INTELLIGENCE MODEL

TECHNICAL FIELD

Embodiments described herein relate to data systems and, more particularly, to systems, methods, devices, and instructions for dynamically switching parallelism modes for operating an artificial intelligence (AI) model, such as a large language model (LLM).

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

DETAILED DESCRIPTION

Figure 1:
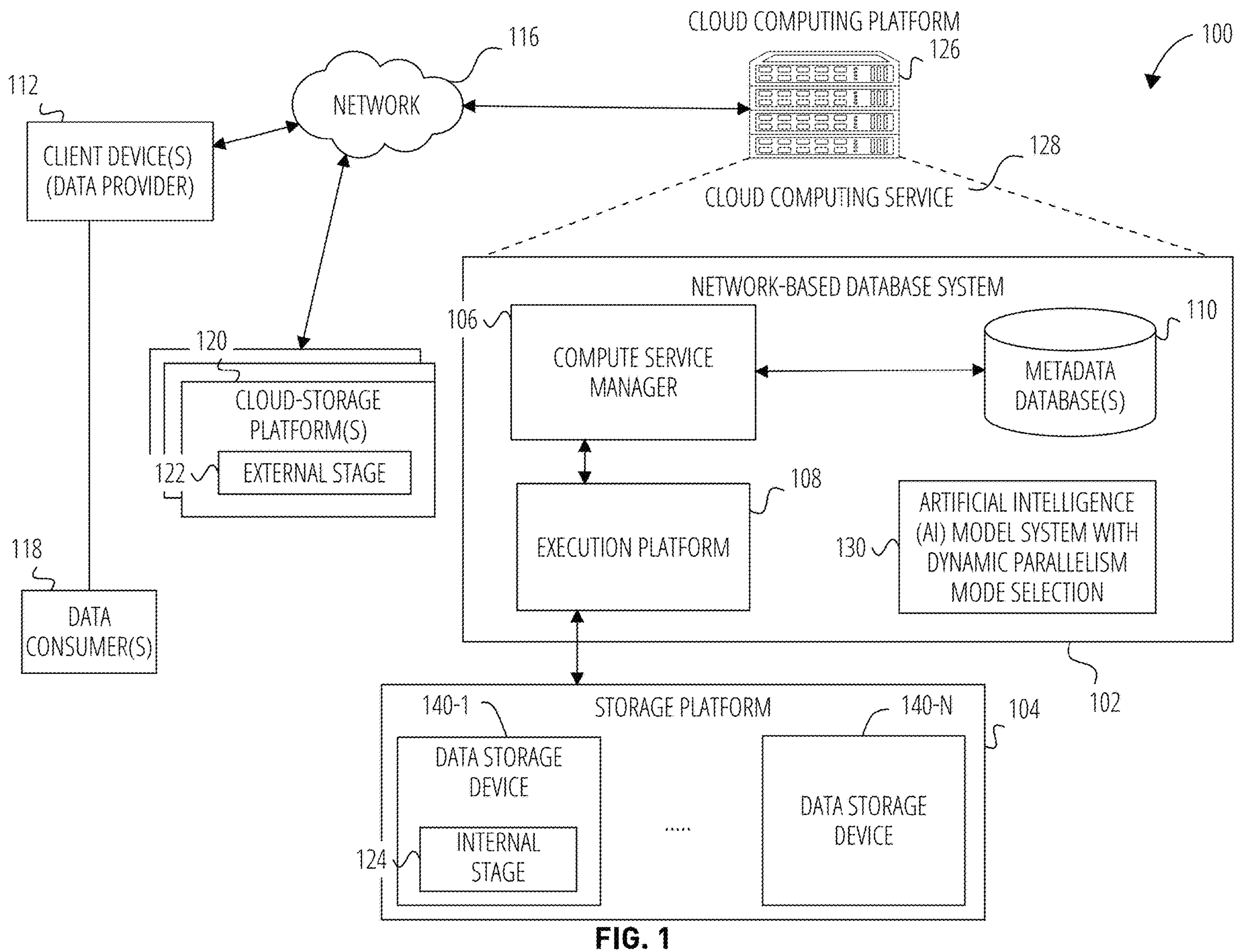
FIG. 1 illustrates an example computing environment comprising a database system in the example form of a network-based database system that includes an artificial intelligence (AI) model system with dynamic parallelism mode selection, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Artificial intelligence (AI) inference systems, which can be used by or form part of a data platform, process requests from users by running trained models to generate responses or predictions. These systems have become widespread across various applications, from interactive chatbots to batch processing workloads. Large language models (LLMs) represent a class of AI systems that process sequences of tokens to generate outputs (e.g., text-based output). In particular, a LLM inference system can process a user request that comprises a sequence of tokens using running one or more trained LLMs to generate a response or a prediction as output. When deployed in production environments, LLMs generally handle diverse workloads with varying characteristics, including different request sizes, arrival patterns, and processing requirements.

Deployed (e.g., production) LLM inference systems can employ parallelism strategies to distribute inference work of an individual LLM across multiple processing units, such as graphics processing units (GPUs). These approaches can include, for example, tensor parallelism, data parallelism, and sequence parallelism techniques. Various parallelism approaches can be used during inference work, each with different computational and communication characteristics that affect system performance metrics.

Real-world inference traffic exhibits dynamic patterns that differ from the homogeneous batch processing common in model training environments. For example, deployed LLM inference systems can experience variable request arrival rates, ranging from periods of low activity to high-traffic bursts, with requests of different sizes and complexity. Typically, performance in LLM inference systems (and other inference systems) can be measured across multiple dimensions, including response latency, token generation speed, and overall system throughput. Traditional inference systems experience these metrics as trade-offs, where optimizing for one performance aspect can compromise performance in other dimensions.

Further, the memory architecture of LLM inference systems (and other inference systems) can comprise caching mechanisms that store intermediate computational states to improve efficiency during sequential processing. The organization and management of these memory structures can further affect how different parallelism strategies for execution of an individual LLM can be implemented and combined within a single system deployment.

Various example embodiments described herein provide for an AI model system that performs inference operations on an individual AI model, such as an LLM, using dynamically selected parallelism (e.g., using dynamic parallelism mode switching), where the parallelism selection can be based on one or more computational workload conditions associated with the individual AI model. For example, the AI model system of some example embodiments switches between two or more different parallelism modes of operation with respect to an individual AI model based on one or more inference request patterns or based on one or more batch characteristics of a set of inference requests (e.g., each inference request comprising its own sequence of tokens) received by the AI model system. Depending on the example embodiment, an AI model system described herein can switch to using tensor parallelism for an individual AI model (e.g., individual LLM) under one or more certain computational workload conditions (e.g., a first inference request pattern or a first batch characteristic for a set of inference requests received by the AI model system) and using sequence parallelism for the individual AI model under one or more other computational workload conditions (e.g., a second inference request pattern or a second batch characteristic for a set of inference requests received by the AI model system). For some example embodiments, the AI model system uses tensor parallelism to spread inference work (e.g., sequences of tokens) for an individual AI model across multiple processing units (e.g., GPUs) when handling small batches of inference requests for the individual AI model, thereby enabling fast generation of individual outputs for those batches of inference requests by the individual AI model. Additionally, for some example embodiments, the AI model system uses sequence parallelism for an individual AI model to efficiently process larger batches of inference requests for the individual AI model, which can provide quick initial response times (e.g., minimize time to first token (TTFT) for an individual LLM) from the individual AI model.

As described herein, tensor parallelism can comprise splitting model weights of an individual AI model (e.g., individual LLM) across multiple processing units (e.g., GPUs) to process an individual inference request (e.g., individual tokens of the individual inference request) for the individual AI model. Tensor parallelism can leverage aggregate compute and memory resources across multiple processing units. Tensor parallelism can, for example, provide benefits for fast token generation at the cost of communication (e.g., token-wise communication) overhead that scales with token length (e.g., where large communication costs can limit throughput performance on large batches).

As described herein, sequence parallelism can comprise dividing portions of an individual inference request (e.g., dividing subsequences of an input sequence of tokens) for an individual AI model across processing units (e.g., GPUs) to parallelize work within the individual inference requests. For example, sequence parallelism can process different portions of a token sequence for the individual AI model on separate processing units. The sequence parallelism can avoid costly communication (e.g., costly token-wise communication) patterns while maintaining processing efficiency. Sequence parallelism can, for example, provide benefits for scenarios involving large numbers of tokens processed simultaneously.

For some example embodiments, the AI model system comprises a cache memory, such as a key-value cache memory, that stores intermediate computational states during sequential parallel processing. For various example embodiments, the cache memory is shared across (e.g., by) a plurality of processing units operating an individual AI model in a parallelism mode (e.g., tensor parallelism mode or sequence parallelism mode). Additionally, the cache memory of various example embodiments comprises a key-value (KV) cache memory (e.g., one that prioritizes reducing inference computation during inference/prompt processing, such as a KV cache memory based on SwiftKV) that reduces redundant computations in the AI model system when processing inputs by reusing results previously calculated and stored in the key-value cache memory by the AI model system. In general, the structure of the cache memory can improve efficiency by reusing previously computed patterns (e.g., previously calculated results). According to various example embodiments, the layout organization of the cache memory is such that different parallelism strategies can be implemented and combined within an AI model system. Specifically, for various example embodiments, the cache memory (e.g., key-value cache memory) maintains layout invariance between different parallelism modes (e.g., configurations) of operation, meaning that the organization of data in the cache memory remains consistent when switching between different parallelism modes (e.g., tensor parallelism mode and sequence parallelism mode) of operation for an individual AI model (e.g., individual LLM). The cache memory layout invariance of various example embodiments enables seamless transitions between parallelism modes without requiring expensive data movement operations.

For some example embodiments, the cache memory layout invariance is achieved when the product of tensor parallelism degree (TP) and sequence parallelism degree (SP) equals a constant value P (e.g., SP×TP=P). In particular, for some example embodiments, the cache memory layout invariance is achieved when the product of tensor parallelism degree and sequence parallelism degree equals a constant value (e.g., total parallelism degree). This invariant property enables seamless switching between the two parallelism modes without requiring expensive data movement or reorganization. For example, an AI model system described herein that uses two-way tensor parallelism with four-way sequence parallelism can share the same cache memory layout as an AI model system described herein that uses eight-way tensor parallelism with one-way sequence parallelism. This relationship allows various example embodiments to dynamically switch between different parallelism combinations.

In some example embodiments, the AI model system comprises logic (e.g., mode switching logic or mode selection logic) to determine, based on one or more computational workload conditions (e.g., computational workload characteristics) of the current workload, appropriate parallelism modes for a current workload for an individual AI model of the AI model system. The logic of the AI model system can analyze one or more factors, including for example batch size, token count, or arrival patterns of inference requests, to determine (e.g., select) an optimal parallelism mode for the AI model system. For example, the AI model system can count input tokens in an inference request and apply different parallelism strategies based on token quantity thresholds.

According to various example embodiments, the AI model system uses tensor parallelism for an individual AI model (e.g., individual LLM) when the AI model system determines that a set of inference requests is a small batch (e.g., relative to a threshold request count value) or comprises a low token count (e.g., relative to a threshold token count value). As described herein, tensor parallelism can provide optimal per-token generation speed and response latency, which can maximize processing efficiency for individual inference requests or interactive applications requiring fast response times. According to various example embodiments, the AI model system selects (e.g., switches to) sequence parallelism for an individual LLM when the AI model system determines that a set of inference requests is a large batch (e.g., relative to a threshold request count value) or comprises a high token count (e.g., relative to a threshold token count value). As described herein, sequence parallelism can provide improved throughput performance and cost efficiency for bulk processing scenarios, which can minimize communication overhead (e.g., relative to tensor parallelism) while maintaining acceptable processing speeds.

For some example embodiments, an AI model system comprises logic (e.g., mode switching logic or mode selection logic) that determines (e.g., selects) the parallelism mode for using an individual AI model (e.g., individual LLM) on a per-forward-pass basis. For example, the logic can evaluate each batch of work (e.g., comprising a set of inference requests, with each inference request comprising a sequence of tokens) and determine an appropriate parallelism mode for processing the batch of work. This approach allows adaptation to changing traffic inference request patterns without requiring separate system deployments.

In some example embodiments, an AI model system comprises logic (e.g., mode switching logic or mode selection logic) that supports switching between parallelism modes (e.g., between tensor parallelism and sequence parallelism) for an individual AI model (e.g., individual LLM) within a single model processing pass. In this way, the AI model system can use different parallelism modes (e.g., strategies) for different layers (e.g., neural network layers) of the individual AI model based on one or more computational characteristics of those different layers. For instance, early layers of the individual AI model can use sequence parallelism while later layers of the individual AI model can use tensor parallelism, or vice versa. Alternatively, or additionally, for some example embodiments, the AI model system comprises one or more components (e.g., mechanisms) for early token filtering or selection during model processing with respect to the individual AI model. For example, some tokens of an inference request can be processed through only initial layers of an individual LLM, while other tokens of the inference request continue through the complete, individual LLM. This selective processing can enable different parallelism modes for different portions of the computational graph.

An AI model system of some example embodiments comprises one or more performance monitoring and optimization components, which can enable the AI model system to measure processing times for different parallelism modes and to adapt one or more thresholds for parallelism mode switching with respect to an individual AI model. Further, for some example embodiments, the AI model system implements one or more machine learning (ML) techniques, such as multi-armed bandit algorithms, to optimize parallelism mode selection decisions.

For some example embodiments, an AI model system accommodates one or more LLMs, which can be of varying layer architectures or configurations. An individual AI model can have different computational requirements for different layers of the individual AI model. Accordingly, the AI model system of some example embodiments determines appropriate parallelism modes for one or more individual layers (e.g., each layer) of the individual AI model based on specific characteristics or processing requirements of those layers. For example, an individual AI model that has undergone neural architecture search, pruning, or compression can exhibit behavior where each layer has different computational shapes and requirements.

According to various example embodiments, an AI model system uses one or more performance models (e.g., ML-based performance models) to select (e.g., predict) optimal parallelism modes (e.g., configurations) for an individual AI model. Depending on the example embodiment, the one or more performance models can consider factors such as layer shapes, batch sizes, or hardware characteristics to recommend an appropriate parallelism mode for the individual AI model. The one or more performance models can train (e.g., learn) from one or more runtime measurements to improve their accuracy over time, thereby enabling more precise parallelism mode selection decisions. For some example embodiments, the AI model system implements an online learning framework that measures processing times for different parallelism modes (e.g., configurations) and adapts thresholds for parallelism mode switching accordingly.

According to various example embodiments, a cache memory of the AI model system uses one or more cache management techniques that integrate with a parallelism mode switching logic of the AI model system. For instance, the cache memory can be configured to reuse intermediate computational results from previous processing iterations to reduce redundant computation for an individual AI model (e.g., individual LLM). This cache reuse can work in conjunction with the parallelism mode switching logic to maintain processing efficiency while transitioning between different parallelism modes. For example, the AI model system can implement a cache memory that implements one or more techniques of SwiftKV that reuse hidden states from earlier transformer layers to eliminate redundant computation during key-value cache generation.

While various example embodiments are described herein with respect to LLMs, for some example embodiments, an AI model system can use the dynamic parallelism mode selection/switching techniques described herein with respect to another type of AI model, such as one that performs non-generative inference operations. In particular, the dynamic parallelism mode selection/switching techniques described herein can be adapted to different types of neural network architectures and processing requirements beyond LLMs and other generative language models. For example, vectorized operations and parallel tokenization techniques can be used to improve processing throughput for embedding and other specialized inference workloads.

According to various example embodiments, the implementation of the AI model system uses one or more existing inference frameworks and extends them with dynamic parallelism capabilities. For instance, the AI model system of various example embodiments can integrate with an established software platform while adding the parallelism switching functionality for individual AI models (e.g., individual LLMs). This approach can allow deployment of the technology without requiring complete system replacement, enabling a user or organization to leverage existing infrastructure investments. The AI model system can be, for example, implemented as plugins or extensions to existing inference systems, thereby providing seamless integration with familiar APIs and interfaces.

Overall, an AI model system of various example embodiments provides a unified approach to LLM system optimization, where a single AI model system deployment (that adapts to varying computational workload conditions and that provides optimal performance across multiple dimensions for an individual AI model) can be used in place of separate AI model system deployments optimized for different metrics. By achieving simultaneous optimization of time to first token (TTFT), time per output token (TPOT), and combined throughput metrics, the unified approach provided by various example embodiments enables a user or organization to achieve optimal latency, throughput, and cost efficiency from a single AI model system deployment, thereby reducing or eliminating the complexity and expense of maintaining multiple specialized inference systems.

As used herein, an AI model can comprise a generative or non-generative AI model. An example of an AI model can include a machine learning (ML) model, a neural network model, and a language model, such as an LLM. As used herein, LLM can include, without limitation, a Generative Pre-trained Transformer (GPT) model, a Large Language Model Meta AI LLaMA®) model, a Mistral model, a Claude model, or another type of large language model (e.g., a proprietary or tailored, generative pre-trained transformer). Generally, an LLM can be constructed using deep learning techniques, such as neural networks, and trained to understand, predict, and generate output data (e.g., text, an image, an audio or a video) by learning patterns, semantics, syntax, and contextual meanings from input data (e.g., text, an image, an audio or a video). With respect to text, an LLM can operate by processing sequences of text and can perform various tasks, such as text completion, translation, summarization, question answering, and dialogue generation, with the ability to generalize across languages and domains based on the scale of training data.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes an artificial intelligence (AI) model system with dynamic parallelism mode selection 130 (hereafter, AI model system 130), according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other example embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™ and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
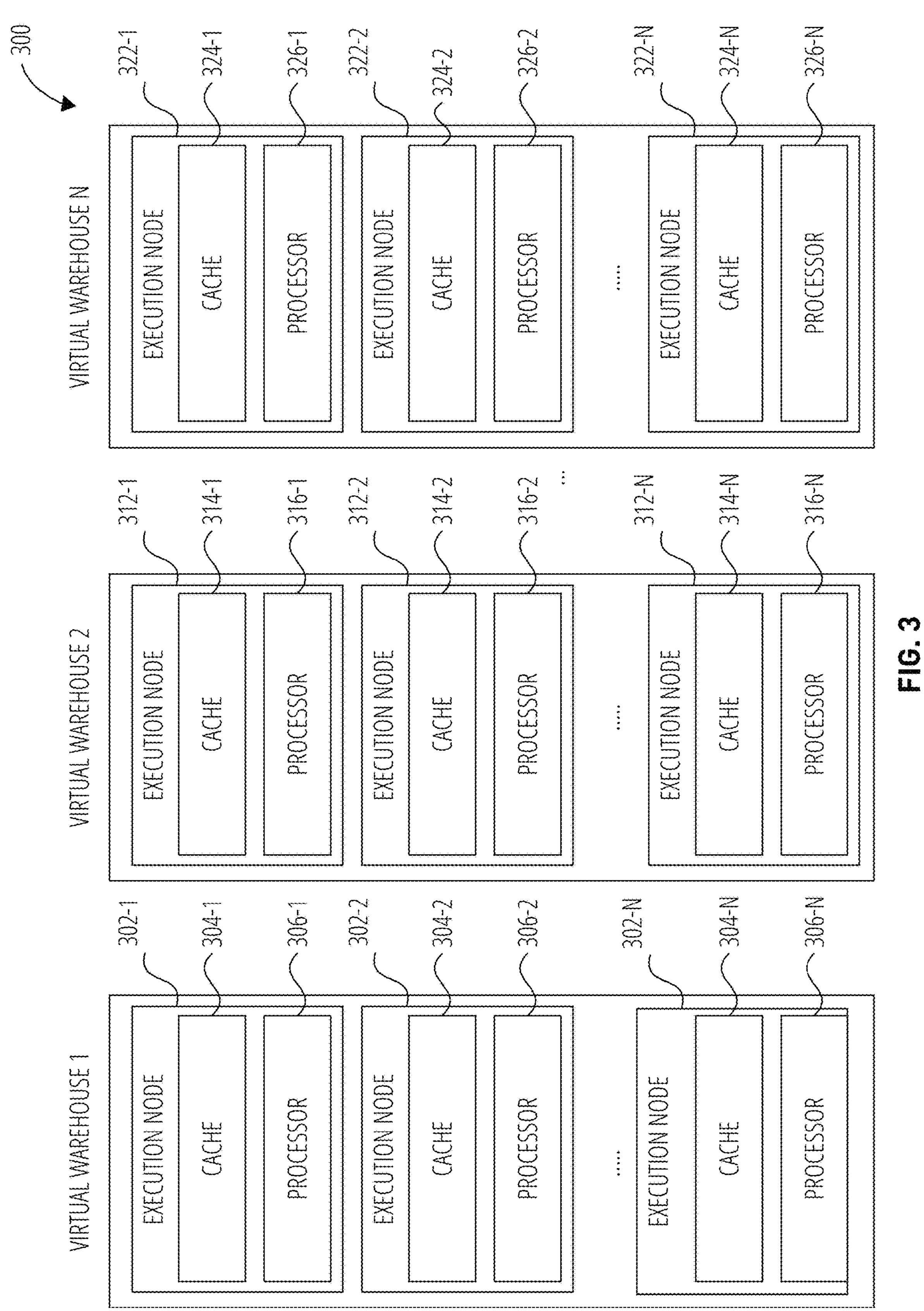
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises the AI model system 130, which implements dynamic switching of parallelism modes for operating an individual AI model, where the parallelism selection can be based on one or more computational workload conditions associated with the individual AI model.

Figure 2:
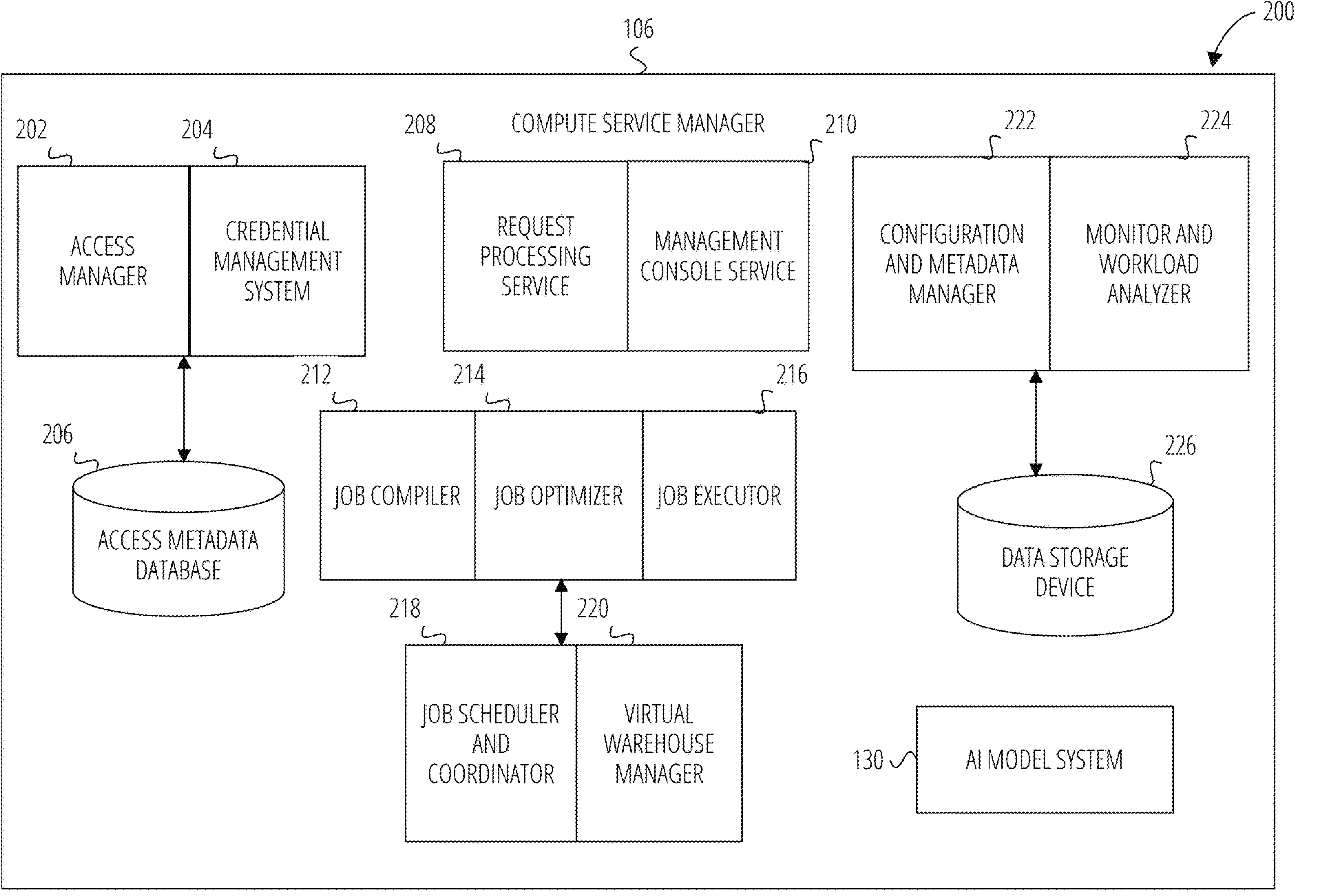
FIG. 2 is a block diagram illustrating components of a compute service manager, according to some example embodiments of the present disclosure.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

As shown, the compute service manager 106 includes the AI model system 130, which can enable the compute service manager 106 to implement dynamic switching of parallelism modes for operating an individual AI model, where the parallelism selection can be based on one or more computational workload conditions associated with the individual AI model.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
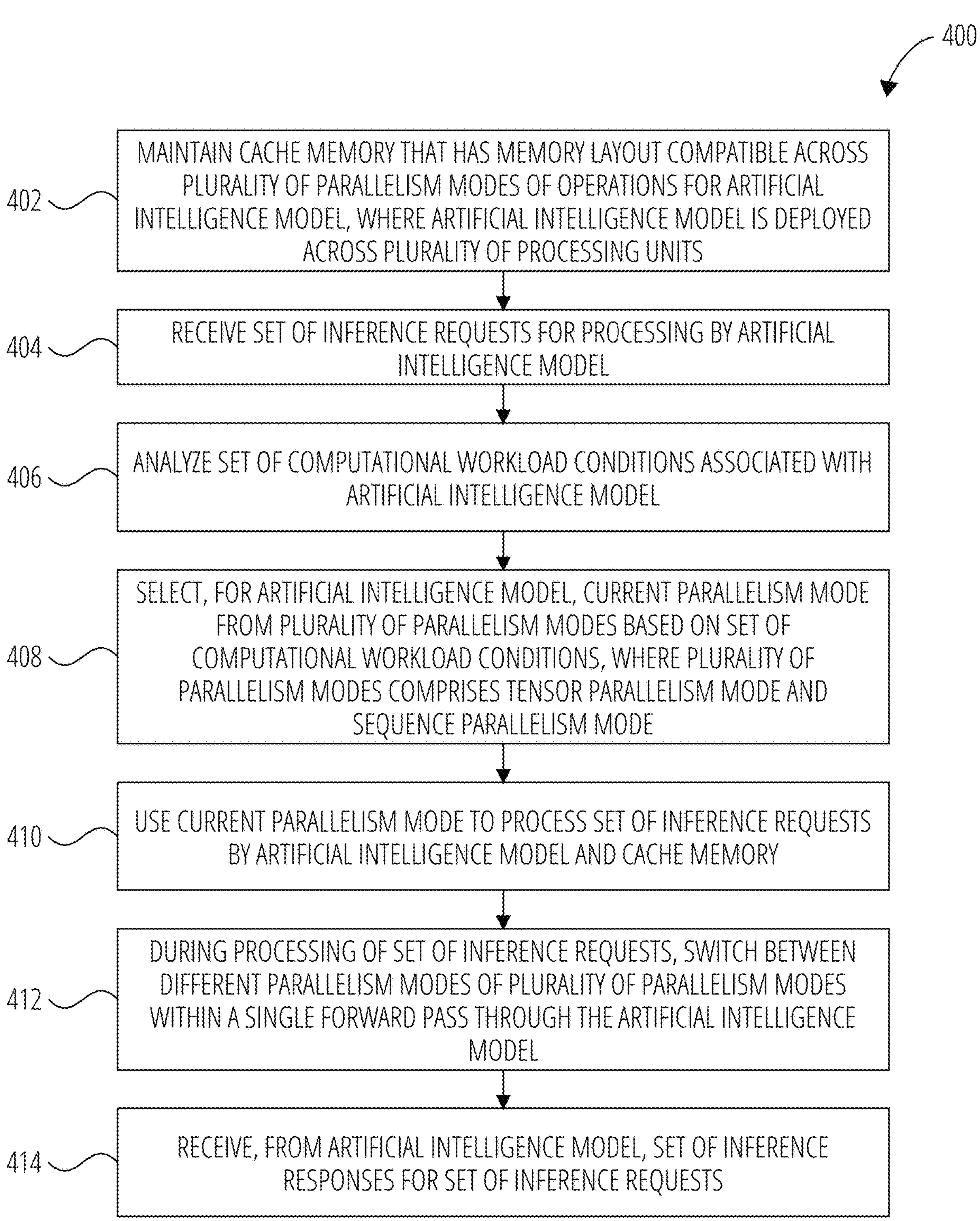
FIG. 4 is a flowchart of an example method for dynamically switching parallelism modes for operating an AI model, according to some example embodiments of the present disclosure.

FIG. 4 is a flowchart of an example method 400 for dynamically switching parallelism modes for operating an AI model, according to some example embodiments of the present disclosure. Method 400 may be embodied in computer-readable instructions for execution by one or more hardware components (e.g., one or more processors) such that the operations of method 400 can be performed by components of the AI model system 130 or the network-based database system 102, such as a network node (e.g., the AI model system 130 executing on a network node of the compute service manager 106) or a computing device (e.g., client device 112), one or both of which may be implemented as machine 600 of FIG. 6 performing the disclosed functions. Accordingly, method 400 is described below, by way of example with reference thereto. However, it shall be appreciated that method 400 can be deployed on various other hardware configurations and is not intended to be limited to deployment within the network-based database system 102.

At operation 402, a processor (e.g., implementing the AI model system 130) maintains a cache memory that has a memory layout compatible across a plurality of parallelism modes of operations for an artificial intelligence model, where the artificial intelligence model is deployed across a plurality of processing units. The plurality of processing units comprises at least one graphics processing unit (GPU), where the GPU can be configured to support the different parallelism modes of the plurality of parallelism modes (e.g., support tensor parallelism mode and sequence parallelism mode). Depending on the example embodiment, deploying the artificial intelligence model across the plurality of processing unit can comprise at least some portion of the artificial intelligence model (e.g., a copy of the artificial intelligence model) being loaded for use by each processing unit of the plurality of processing units, or each processing unit of the plurality of processing units being configured to use the artificial intelligence model. According to some example embodiments, the artificial intelligence model is deployed (e.g., loaded) across the plurality of processing units, which can enable distributed processing capabilities.

For some example embodiments, the cache memory is configured with a memory layout that remains compatible when the artificial intelligence model switches between and operates in different parallelism modes of the plurality of parallelism modes. The memory layout compatibility can ensure that cached data can be efficiently accessed and used regardless of which parallelism mode is currently active. For various example embodiments, the memory layout is compatible across the tensor parallelism mode and the sequence parallelism mode when a product of a first degree of parallelism being used during the tensor parallelism mode and a second degree of parallelism being used during the sequence parallelism mode equals a constant value. The constant value can represent a total degree of parallelism. For various example embodiments, at least some portion (e.g., all) of cached intermediate computation results stored in the cache memory is preserved during transitions (e.g., switches) between different parallelism modes of the plurality of parallelism modes. As described herein, the cache memory is shared across (e.g., by) the plurality of processing units to which the individual AI model is deployed (e.g., loaded) for operation. Additionally, the cache memory can comprise a key-value (KV) cache memory, such as one that prioritizes reducing inference computation during inference/prompt processing. For example, the KV cache memory can be based on SwiftKV, which reduces redundant computations in the AI model system by reusing results previously calculated and stored in the key-value cache memory by the AI model system.

During operation 404, the processor (e.g., implementing the AI model system 130) receives (e.g., from a client device 112) a set of inference requests for processing by the artificial intelligence model. For various example embodiments, the set of inference requests comprises individual inference requests to be processed (by the plurality of processing units) using the artificial intelligence model to generate corresponding inference responses. The set of inference requests can represent a batch of inference requests to be processed (by the plurality of processing units) using the artificial intelligence model under a parallelism mode (e.g., tensor parallelism mode or sequence parallelism mode). According to some example embodiments, an individual inference request of the set of inference requests comprises a sequence of tokens. For instance, an individual inference request of the set of inference requests can comprise a prompt (e.g., submitted by a user at the client device 112), which the artificial intelligence model can receive and process as input and generate an output (e.g., text, image, or video output). According to some example embodiments, each inference request in the set comprises input data (e.g., input tokens) that the artificial intelligence model will process to produce meaningful outputs (e.g., text, image, or video output).

At operation 406, the processor (e.g., implementing the AI model system 130) analyzes a set of computational workload conditions associated with the artificial intelligence model. For some example embodiments, the analysis of computational workload conditions comprises evaluating one or more various metrics or characteristics, which can affect the performance of the artificial intelligence model. In some example embodiments, the set of computational workload conditions comprises one or more factors, such the token quantity in one or more inference requests of the set of inference requests, a (batch) size of the set of inference requests (e.g., number of inference requests in the set), a computational complexity of one or more inference requests of the set of inference requests, or one or more processing unit utilization metrics of the plurality of processing units.

During operation 408, the processor (e.g., implementing the AI model system 130) selects (e.g., dynamically selects), for operating the artificial intelligence model, a current parallelism mode from the plurality of parallelism modes based on the set of computational workload conditions. Depending on the example embodiment, the set of computational workload conditions can comprise one or more computational workload characteristics of one or more inference requests, which can enable the processor to determine processing requirements. For various example embodiments, the plurality of parallelism modes comprises a tensor parallelism mode and a sequence parallelism mode. For various example embodiments, operation 408 comprises switching or transitioning (e.g., during runtime of the artificial intelligence model) between different parallelism modes of operation for the artificial intelligence model based on the analyzed set of computational workload conditions. According to some example embodiments, the tensor parallelism mode causes a set of parameters (e.g., a set of weights) of the artificial intelligence model to be distributed across the plurality of processing units (e.g., each processing unit receives and uses a different subset of the set of weights) and causes each inference request (e.g., a copy of each inference request in its entirety) of the set of inference requests to be distributed to each processing unit of the plurality of processing units for inference processing. In some example embodiments, the sequence parallelism mode causes the set of parameters to be distributed to each processing unit of the plurality of processing units (e.g., each processing unit receives and uses the entire set of weights) and causes different portions of each inference request of the set of inference requests to be distributed across the plurality of processing units for inference processing (e.g., each processing unit receives and processes a different portion of an individual inference request). Where an individual inference request of the set of inference requests comprises a sequence of tokens, each different portion of the individual inference request can comprise a different subsequence of tokens from the sequence of tokens.

For some example embodiments, operation 408 comprises selecting the tensor parallelism mode based on the set of computational workload conditions indicating a low token density (e.g., per inference request) processing condition for the artificial intelligence model. For instance, the low token density processing condition can exist based on token numbers in individual inference requests of the sets of inference requests being less than a token density threshold value. Additionally, for some example embodiments, operation 408 comprises selecting the sequence parallelism mode based on the set of computational workload conditions indicating a high token density (e.g., per inference request or per a set of inference requests) processing condition for the artificial intelligence model. For instance, the high token density processing condition can exist based on token numbers in individual inference requests of the sets of inference requests being greater than a token density threshold value. Depending on the example embodiment, the token density threshold value can comprise a predetermined value that can be set by a user, such as an admin of the AI model system (e.g., 130). Alternatively, the token density threshold value can be determined dynamically (e.g., based on one or more current conditions) or some other methodology.

For various example embodiments, operation 408 comprises using a performance prediction model (e.g., comprising a machine learning model) to select the current parallelism mode based on the set of computational workload conditions and one or more configurations of the plurality of processing units. Depending on the example embodiment, the performance prediction model can receive as input, for example, a batch size of the set of inference requests, layer configuration data of the artificial intelligence model, or current utilization metrics of one or more of the plurality of processing units. According to some example embodiments, the performance prediction model uses an online learning technique to adaptively determine switching decisions based on a set of runtime performance measurements. The online learning technique can comprise, for instance, a multi-armed bandit optimization technique that explores different parallelism configurations during a training period, where the training period can comprise a predetermined number of processing iterations or a predetermined time duration. Additionally, the multi-armed bandit optimization technique can alternate between an exploration phase and an exploitation phase based on accumulated performance data. The set of runtime performance measurements used by the online learning technique can comprise at least one of actual execution time, memory utilization, or communication overhead metrics.

At operation 410, the processor (e.g., implementing the AI model system 130) uses current parallelism mode to process the set of inference requests using the artificial intelligence model and the cache memory. For some example embodiments, operation 410 comprises applying the current parallelism mode to execute the set of inference requests efficiently using both the artificial intelligence model and the cache memory. As described herein, the cache memory with its compatible memory layout enables efficient data access and storage during the processing regardless of the current parallelism mode selected from the plurality of parallelism modes.

For some example embodiments, the artificial intelligence model comprises a neural network model. During processing of the set of inference requests, at operation 412, the processor (e.g., implementing the AI model system 130) can switch between different parallelism modes of plurality of parallelism modes (e.g., tensor parallelism mode to sequence parallelism mode, or vice versa) within a single forward pass through the artificial intelligence model based on one or more or runtime conditions, which can include layer-specific computational requirements of the neural network model. Additionally, the switching between the different parallelism modes can occur after processing a subset of tokens through early exit logic that filters tokens based on computational significance, where the early exit logic can determine computational significance based on attention weights exceeding a predetermined threshold value. The layer-specific computational requirement of a given layer of the neural network model can be determined based on the number of attention heads and hidden dimensions in the given layer. The neural network model can comprise layers with varying computational shapes, and an individual parallelism mode can be selected independently for each individual layer of the neural network model based on one or more layer-specific characteristics of the individual layer (e.g., at least one of: layer dimensions, parameter count, or computational complexity metrics). The switching between parallelism modes can occur, for example, at predetermined layer boundaries within the neural network model. For various example embodiments, the dynamic switching during a single forward pass of the artificial intelligence model enables the processor to adapt the parallelism mode strategy to optimize performance. Additionally, this intra-forward-pass switching capability can provide enhanced flexibility and performance optimization compared to systems that maintain a single parallelism mode throughout an entire forward pass.

At operation 414, the processor (e.g., implementing the AI model system 130) receives, from the artificial intelligence model (deployed across the plurality of processing units), a set of inference responses for the set of inference requests. In particular, each inference response of the set of inference responses can comprise (e.g., at least a portion of) output generated by the artificial intelligence model after receiving (as input) and processing a corresponding inference request of the set of inference requests. Accordingly, each inference response in the set of inference responses can correspond to a respective inference request from the set of inference requests. For various example embodiments, one or more of the set of inference responses are used to generate, or delivered as, output to a user (e.g., at the client device 112), such as through a graphical user interface being displayed on a client device (e.g., 112). For some example embodiments, the processor receives the set of inference responses after the artificial intelligence model has processed all inference requests in the set of inference requests.

Figure 5:
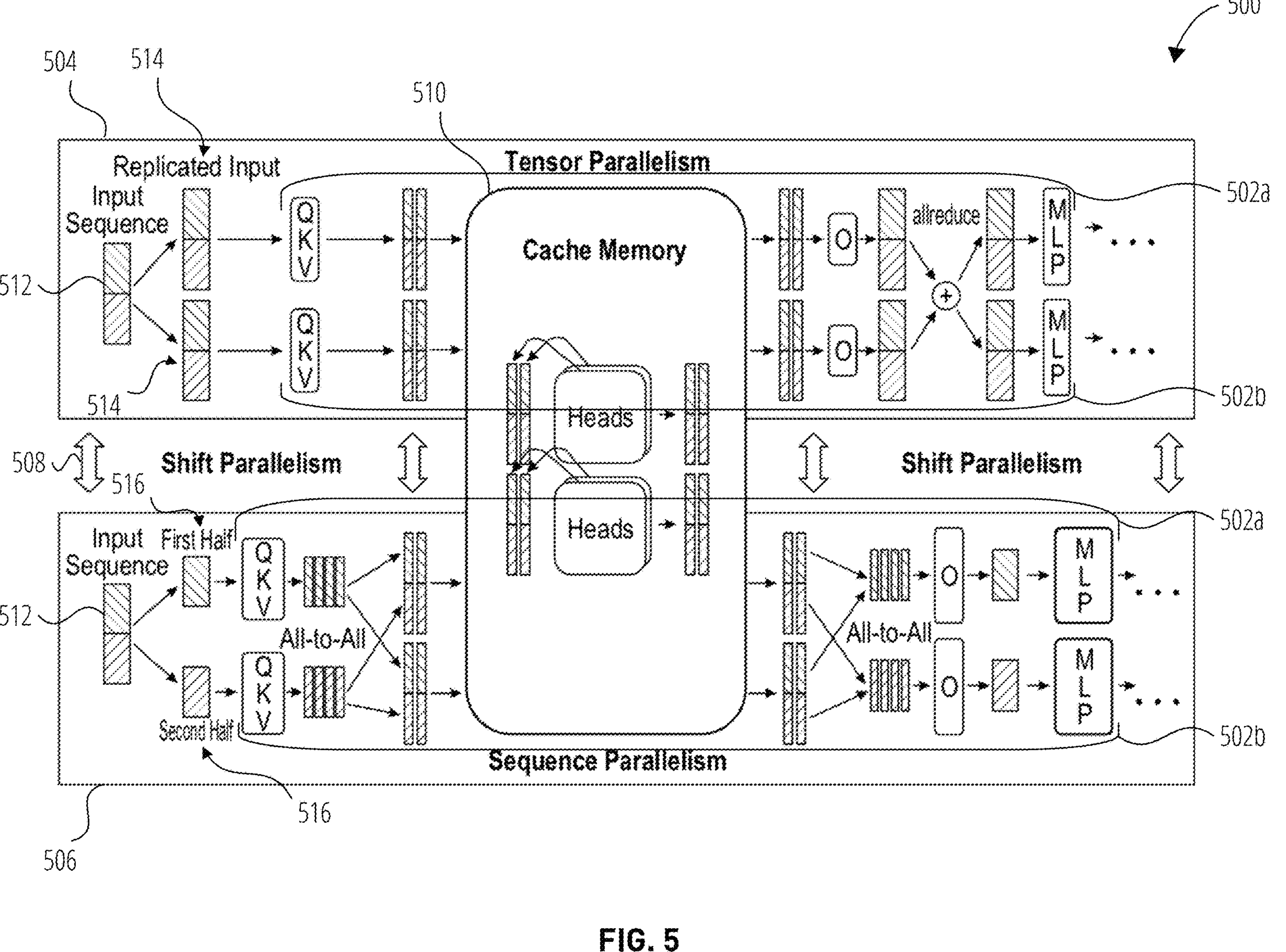
FIG. 5 is a block diagram illustrating an example architecture of an AI model system with dynamic parallelism mode switching, according to some example embodiments of the present disclosure.

FIG. 5 is a block diagram illustrating an example architecture of an AI model system 500 with dynamic parallelism mode switching, according to some example embodiments of the present disclosure. As described herein, the dynamic parallelism mode selection by AI model system 500 enables the AI model system 500 to optimize performance for varying workload characteristics while maintaining a single deployment configuration. In particular, the AI model system 500 uses shift parallelism 508 to dynamically switch between tensor parallelism 504 and sequence parallelism 506 based on one or more computational workload conditions associated with an artificial intelligence model (e.g., LLM) deployed across a plurality of processing units (e.g., GPUs). AI model 502*a* and AI model 502*b* represent instances of the same artificial intelligence model (e.g., same LLM) deployed across different processing units of the plurality of processing units—AI model 502*a* being deployed (e.g., loaded) on one processing unit of the plurality of processing units, and AI model 502*b* being deployed (e.g., loaded) on another processing unit of the plurality of processing units. As shown, the AI model system 500 implements or otherwise uses tensor parallelism 504 for processing individual inference requests across multiple processing units by distributing model parameters while replicating input data (e.g., replicating input sequence of tokens 512 as replicated inputs 514). As also shown, the AI model system 500 implements or otherwise uses sequence parallelism 506 for processing large batches of inference requests by distributing different portions of input data (e.g., splitting up input sequence of tokens 512 into different halves 516) across the processing units while maintaining complete model parameters on each processing unit.

The shift parallelism 508 enables seamless switching between tensor parallelism 504 and sequence parallelism 506 because the cache memory 510 maintains a memory layout that remains compatible across both parallelism modes, thereby allowing seamless transitions between parallelism modes without requiring expensive data reorganization. Additionally, the cache memory 510 can retain/preserve intermediate computational results stored in the cache memory 510 between switching/transitions of parallelism modes. As described herein, this compatibility can be achieved when the product of tensor parallelism degree (TP) and sequence parallelism degree (SP) equals a constant value P ($SP \times TP = P$), allowing transitions without requiring expensive data reorganization. As also described herein, the cache memory 510 comprises a key-value (KV) cache memory that stores intermediate computational states and is shared across the plurality of processing units.

During operation, the AI model system 500 can analyze one or more computational workload conditions, such as batch size or token count, and select, for example, tensor parallelism 504 for low token density processing conditions and sequence parallelism 506 for high token density processing conditions. Such dynamic parallelism mode switching can enable the AI model system 500 to achieve optimal performance across multiple dimensions (e.g., first token (TTFT) and time per output token (TPOT)) in a single deployment.

Figure 6:
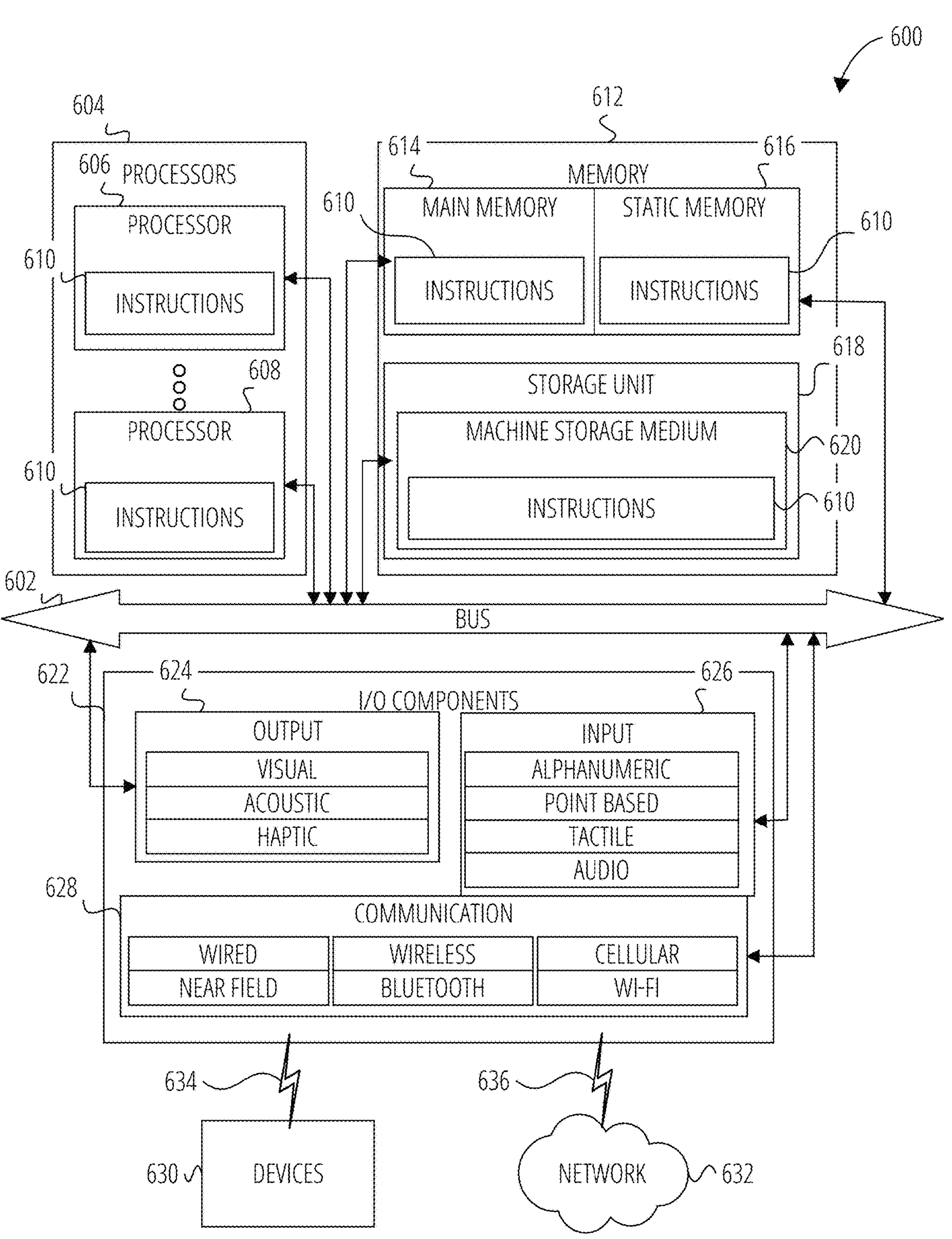
FIG. 6 illustrates a diagrammatic representation of a machine in the form of a computer system within which a set of instructions can be executed for causing the machine to perform any one or more of the methodologies discussed herein, according to some example embodiments of the present disclosure.

FIG. 6 illustrates a diagrammatic representation of a machine 600 in the form of a computer system within which a set of instructions can be executed for causing the machine 600 to perform any one or more of the methodologies discussed herein, according to some example embodiments of the present disclosure. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein can be executed. For example, the instructions 610 may cause the machine 600 to execute any one or more operations of any one or more of the methods described herein. As another example, the instructions 610 may cause the machine 600 to implement portions of the data flows described herein. In this way, the instructions 610 transform a general, non-programmed machine into a particular machine 600 (e.g., the compute service manager 106, the execution platform 108, client device 112) that is specially configured to carry out any one of the described and illustrated functions in the manner described herein.

In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines machine 600 that individually or jointly execute the instructions 610 to perform any one or more of the methodologies discussed herein.

The machine 600 includes processors 604, memory 612, and input/output (I/O) components 622 configured to communicate with each other such as via a bus 602. In an example embodiment, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 606 and a processor 608 that may execute the instructions 610. The term "processor" is intended to include multi-core processors 604 that may comprise two or more independent processors (sometimes referred to as "cores") that may execute instructions 610 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 612 may include a main memory 614, a static memory 616, and a storage unit 618, all accessible to the processors 604 such as via the bus 602. The main memory 614, the static memory 616, and the storage unit 618 comprising a machine storage medium 620 may store the instructions 610 embodying any one or more of the methodologies or functions described herein. The instructions 610 may also reside, completely or partially, within the main memory 614, within the static memory 616, within the storage unit 618, within at least one of the processors 604 (e.g., within the processor's cache memory), or any suitable combination thereof, during execution thereof by the machine 600.

The I/O components 622 include components to receive input, provide output, produce output, transmit information, exchange information, capture measurements, and so on. The specific I/O components 622 that are included in a particular machine 600 will depend on the type of machine. For example, portable machines such as mobile phones will likely include a touch input device or other such input mechanisms, while a headless server machine will likely not include such a touch input device. It will be appreciated that the I/O components 622 may include many other components that are not shown in FIG. 6. The I/O components 622 are grouped according to functionality merely for simplifying the following discussion and the grouping is in no way limiting. In various example embodiments, the I/O components 622 may include output components 624 and input components 626. The output components 624 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 622 may include communication components 628 operable to couple the machine 600 to a network 632 via a coupling 636 or to devices 630 via a coupling 634. For example, the communication components 628 may include a network interface component or another suitable device to interface with the network 632. In further examples, the communication components 628 may include wired communication components, wireless communication components, cellular communication components, and other communication components to provide communication via other modalities. The devices 630 can be another machine or any of a wide variety of peripheral devices (e.g., a peripheral device coupled via a universal serial bus (USB)). For example, as noted above, the machine 600 may correspond to any client device, the compute service manager 106, the execution platform 108, and the devices 630 may include any other of these systems and devices.

The various memories (e.g., 612, 614, 616, and/or memory of the processor(s) 604 and/or the storage unit 618) may store one or more sets of instructions 610 and data structures (e.g., software) embodying or utilized by any one or more of the methodologies or functions described herein. These instructions 610, when executed by the processor(s) 604, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 632 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 632 or a portion of the network 632 may include a wireless or cellular network, and the coupling 636 can be a Code Division Multiple Access (CDMA) connection, a Global System for Mobile communications (GSM) connection, or another type of cellular or wireless coupling. In this example, the coupling 636 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 610 can be transmitted or received over the network 632 using a transmission medium via a network interface device (e.g., a network interface component included in the communication components 628) and utilizing any one of a number of well-known transfer protocols (e.g., hypertext transfer protocol (HTTP)). Similarly, the instructions 610 can be transmitted or received using a transmission medium via the coupling 634 (e.g., a peer-to-peer coupling) to the devices 630. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 610 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other example embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: maintaining a cache memory that has a memory layout compatible across a plurality of parallelism modes of operations for an artificial intelligence model, the artificial intelligence model being deployed across a plurality of processing units; receiving a set of inference requests for processing by the artificial intelligence model; analyzing a set of computational workload conditions associated with the artificial intelligence model; selecting, for the artificial intelligence model, a current parallelism mode from the plurality of parallelism modes based on the set of computational workload conditions, the plurality of parallelism modes comprising a tensor parallelism mode and a sequence parallelism mode, the tensor parallelism mode causing a set of parameters of the artificial intelligence model to be distributed across the plurality of processing units and causing each inference request of the set of inference requests to be distributed to each processing unit of the plurality of processing units for inference processing, the sequence parallelism mode causing the set of parameters to be distributed to each processing unit of the plurality of processing units and causing different portions of each inference request of the set of inference requests to be distributed across the plurality of processing units for inference processing; using the current parallelism mode to process the set of inference requests using the artificial intelligence model and the cache memory; and receiving, from the artificial intelligence model, a set of inference responses for the set of inference requests.

In Example 2, the subject matter of Example 1 includes, wherein the memory layout is compatible across the tensor parallelism mode and the sequence parallelism mode when a product of a first degree of parallelism being used during the tensor parallelism mode and a second degree of parallelism being used during the sequence parallelism mode equals a constant value.

In Example 3, the subject matter of Examples 1-2 includes, wherein the set of computational workload conditions comprises at least one of: token quantity in one or more inference requests of the set of inference requests; a size of the set of inference requests; a computational complexity of one or more inference requests of the set of inference requests; or one or more processing unit utilization metrics of the plurality of processing units.

In Example 4, the subject matter of Examples 1-3 includes, wherein the plurality of processing units comprises at least one graphics processing unit (GPU).

In Example 5, the subject matter of Examples 1-4 includes, wherein an individual inference request of the set of inference requests comprises a sequence of tokens, and wherein each different portion of the individual inference request comprises a different subsequence of tokens from the sequence of tokens.

In Example 6, the subject matter of Examples 1-5 includes, wherein the artificial intelligence model comprises a large language model.

In Example 7, the subject matter of Examples 1-6 includes, wherein the selecting of the current parallelism mode from the plurality of parallelism modes based on the set of computational workload conditions comprises: selecting the tensor parallelism mode based on the set of computational workload conditions indicating a low token density processing condition for the artificial intelligence model.

In Example 8, the subject matter of Example 7 includes, wherein the low token density processing condition exists based on token numbers in individual inference requests of the sets of inference requests being less than a token density threshold value.

In Example 9, the subject matter of Examples 1-8 includes, wherein the selecting of the current parallelism mode from the plurality of parallelism modes based on the set of computational workload conditions comprises: selecting the sequence parallelism mode based on the set of computational workload conditions indicating a high token density processing condition for the artificial intelligence model.

In Example 10, the subject matter of Example 9 includes, wherein the high token density processing condition exists based on token numbers in individual inference requests of the sets of inference requests being greater than a token density threshold value.

In Example 11, the subject matter of Examples 1-10 includes, wherein at least some portion of cached intermediate computation results stored in the cache memory is preserved during transitions between different parallelism modes.

In Example 12, the subject matter of Examples 1-11 includes, wherein the artificial intelligence model comprises a neural network model, and wherein the operations comprise: during processing of the set of inference requests, switching between different parallelism modes of the plurality of parallelism modes within a single forward pass through the neural network model based on layer-specific computational requirements of the neural network model.

In Example 13, the subject matter of Example 12 includes, wherein the neural network model comprises layers with varying computational shapes, and wherein an individual parallelism mode is selected independently for each individual layer of the neural network model based on one or more layer-specific characteristics of the individual layer.

In Example 14, the subject matter of Examples 12-13 includes, wherein the switching between the different parallelism modes occurs after processing a subset of tokens through early exit logic that filters tokens based on computational significance.

In Example 15, the subject matter of Example 14 includes, wherein the early exit logic determines computational significance based on attention weights exceeding a predetermined threshold value.

In Example 16, the subject matter of Examples 1-15 includes, wherein the selecting of the current parallelism mode from the plurality of parallelism modes based on the set of computational workload conditions comprises: using a performance prediction model to select the current parallelism mode based on the set of computational workload conditions and one or more configurations of the plurality of processing units.

In Example 17, the subject matter of Example 16 includes, wherein the performance prediction model uses an online learning technique to adaptively determine switching decisions based on a set of runtime performance measurements.

In Example 18, the subject matter of Example 17 includes, wherein the set of runtime performance measurements comprise at least one of actual execution time, memory utilization, or communication overhead metrics.

Example 19 is a method to implement any of Examples 1-18.

Example 20 is a machine-storage medium storing instructions that when executed by a machine, cause the machine to perform operations to implement any of Examples 1-18.

Although the example embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other example embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other example embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one processor; and
at least one memory storing instructions that cause the at least one processor to perform operations comprising:
maintaining a cache memory that has a memory layout compatible across a plurality of parallelism modes of operations for an artificial intelligence model, the artificial intelligence model comprising a neural network model, the artificial intelligence model being deployed across a plurality of processing units;
receiving a set of inference requests for processing by the artificial intelligence model;
analyzing a set of computational workload conditions associated with the artificial intelligence model;
selecting, for the artificial intelligence model, a current parallelism mode from the plurality of parallelism modes based on the set of computational workload conditions, the plurality of parallelism modes comprising a tensor parallelism mode and a sequence parallelism mode, the tensor parallelism mode causing a set of parameters of the artificial intelligence model to be distributed across the plurality of processing units such that each processing unit receives, stores, and uses a different subset of the set of parameters of the artificial intelligence model, the tensor parallelism mode causing each inference request of the set of inference requests to be distributed to each processing unit of the plurality of processing units for inference processing, the sequence parallelism mode causing the set of parameters to be distributed to each processing unit of the plurality of processing units such that each processing unit receives, stores, and uses an entire set of parameters of the artificial intelligence model, the sequence parallelism mode causing different portions of each inference request of the set of inference requests to be distributed across the plurality of processing units for inference processing;
using the current parallelism mode to process the set of inference requests using the artificial intelligence model and the cache memory;
receiving, from the artificial intelligence model, a set of inference responses for the set of inference requests; and
during processing of the set of inference requests and after processing a subset of tokens through early exit logic that filters tokens based on computational significance, switching between different parallelism modes of the plurality of parallelism modes within a single forward pass through the neural network model based on layer-specific computational requirements of the neural network model.

2. The system of claim 1, wherein the memory layout is compatible across the tensor parallelism mode and the sequence parallelism mode when a product of a first degree of parallelism being used during the tensor parallelism mode and a second degree of parallelism being used during the sequence parallelism mode equals a constant value.

3. The system of claim 1, wherein the set of computational workload conditions comprises at least one of:
token quantity in one or more inference requests of the set of inference requests;
a size of the set of inference requests;
a computational complexity of one or more inference requests of the set of inference requests; or
one or more processing unit utilization metrics of the plurality of processing units.

4. The system of claim 1, wherein the plurality of processing units comprises at least one graphics processing unit (GPU).

5. The system of claim 1, wherein an individual inference request of the set of inference requests comprises a sequence of tokens, and wherein each different portion of the individual inference request comprises a different subsequence of tokens from the sequence of tokens.

6. The system of claim 1, wherein the artificial intelligence model comprises a large language model.

7. The system of claim 1, wherein the selecting of the current parallelism mode from the plurality of parallelism modes based on the set of computational workload conditions comprises:
selecting the tensor parallelism mode based on the set of computational workload conditions indicating a low token density processing condition for the artificial intelligence model.

8. The system of claim 7, wherein the low token density processing condition exists based on token numbers in individual inference requests of the sets of inference requests being less than a token density threshold value.

9. The system of claim 1, wherein the selecting of the current parallelism mode from the plurality of parallelism modes based on the set of computational workload conditions comprises:
selecting the sequence parallelism mode based on the set of computational workload conditions indicating a high token density processing condition for the artificial intelligence model.

10. The system of claim 9, wherein the high token density processing condition exists based on token numbers in individual inference requests of the sets of inference requests being greater than a token density threshold value.

11. The system of claim 1, wherein at least some portion of cached intermediate computation results stored in the cache memory is preserved during transitions between different parallelism modes.

12. The system of claim 1, wherein the neural network model comprises layers with varying computational shapes, and wherein an individual parallelism mode is selected independently for each individual layer of the neural network model based on one or more layer-specific characteristics of the individual layer.

13. The system of claim 1, wherein the early exit logic determines computational significance based on attention weights exceeding a predetermined threshold value.

14. The system of claim 1, wherein the selecting of the current parallelism mode from the plurality of parallelism modes based on the set of computational workload conditions comprises:
using a performance prediction model to select the current parallelism mode based on the set of computational workload conditions and one or more configurations of the plurality of processing units.

15. The system of claim 14, wherein the performance prediction model uses an online learning technique to adaptively determine switching decisions based on a set of runtime performance measurements.

16. The system of claim 15, wherein the set of runtime performance measurements comprise at least one of actual execution time, memory utilization, or communication overhead metrics.

17. A method comprising:

maintaining, by at least one processor, a cache memory that has a memory layout compatible across a plurality of parallelism modes of operations for an artificial intelligence model, the artificial intelligence model comprising a neural network model, the artificial intelligence model being deployed across a plurality of processing units;

receiving, by the at least one processor, a set of inference requests for processing by the artificial intelligence model;

analyzing, by the at least one processor, a set of computational workload conditions associated with the artificial intelligence model;

selecting, by the at least one processor and for the artificial intelligence model, a current parallelism mode from the plurality of parallelism modes based on the set of computational workload conditions, the plurality of parallelism modes comprising a tensor parallelism mode and a sequence parallelism mode, the tensor parallelism mode causing a set of parameters of the artificial intelligence model to be distributed across the plurality of processing units such that each processing unit receives, stores, and uses a different subset of the set of parameters of the artificial intelligence model, the tensor parallelism mode causing each inference request of the set of inference requests to be distributed to each processing unit of the plurality of processing units for inference processing, the sequence parallelism mode causing the set of parameters to be distributed to each processing unit of the plurality of processing such that each processing unit receives, stores, and uses an entire set of parameters of the artificial intelligence model, the sequence parallelism mode causing different portions of each inference request of the set of inference requests to be distributed across the plurality of processing units for inference processing;

using, by the at least one processor, the current parallelism mode to process the set of inference requests using the artificial intelligence model and the cache memory;

receiving, by the at least one processor and from the artificial intelligence model, a set of inference responses for the set of inference requests; and during processing of the set of inference requests and after processing a subset of tokens through early exit logic that filters tokens based on computational significance, switching, by the at least one processor, between different parallelism modes of the plurality of parallelism modes within a single forward pass through the neural network model based on layer-specific computational requirements of the neural network model.

18. The method of claim 17, wherein the memory layout is compatible across the tensor parallelism mode and the sequence parallelism mode when a product of a first degree of parallelism being used during the tensor parallelism mode and a second degree of parallelism being used during the sequence parallelism mode equals a constant value.

19. The method of claim 17, wherein the set of computational workload conditions comprises at least one of:

token quantity in one or more inference requests of the set of inference requests;

a size of the set of inference requests;

a computational complexity of one or more inference requests of the set of inference requests; or one or more processing unit utilization metrics of the plurality of processing units.

20. The method of claim 17, wherein the plurality of processing units comprises at least one graphics processing unit (GPU).

21. The method of claim 17, wherein an individual inference request of the set of inference requests comprises a sequence of tokens, and wherein each different portion of the individual inference request comprises a different subsequence of tokens from the sequence of tokens.

22. The method of claim 17, wherein the artificial intelligence model comprises a large language model.

23. The method of claim 17, wherein the selecting of the current parallelism mode from the plurality of parallelism modes based on the set of computational workload conditions comprises:

selecting the tensor parallelism mode based on the set of computational workload conditions indicating a low token density processing condition for the artificial intelligence model.

24. The method of claim 23, wherein the low token density processing condition exists based on token numbers in individual inference requests of the sets of inference requests being less than a token density threshold value.

25. The method of claim 17, wherein the selecting of the current parallelism mode from the plurality of parallelism modes based on the set of computational workload conditions comprises:

selecting the sequence parallelism mode based on the set of computational workload conditions indicating a high token density processing condition for the artificial intelligence model.

26. The method of claim 25, wherein the high token density processing condition exists based on token numbers in individual inference requests of the sets of inference requests being greater than a token density threshold value.

27. The method of claim 17, wherein at least some portion of cached intermediate computation results stored in the cache memory is preserved during transitions between different parallelism modes.

28. The method of claim 17, wherein the early exit logic determines computational significance based on attention weights exceeding a predetermined threshold value.

29. A machine-storage medium storing instructions that when executed by a machine, cause the machine to perform operations comprising:

maintaining a cache memory that has a memory layout compatible across a plurality of parallelism modes of operations for an artificial intelligence model, the artificial intelligence model comprising a neural network model, the artificial intelligence model being deployed across a plurality of processing units;

receiving a set of inference requests for processing by the artificial intelligence model;

analyzing a set of computational workload conditions associated with the artificial intelligence model;

selecting, for the artificial intelligence model, a current parallelism mode from the plurality of parallelism modes based on the set of computational workload conditions, the plurality of parallelism modes comprising a tensor parallelism mode and a sequence parallelism mode, the tensor parallelism mode causing a set of parameters of the artificial intelligence model to be distributed across the plurality of processing units such that each processing unit receives, stores, and uses a different subset of the set of parameters of the artificial intelligence model, the tensor parallelism mode causing each inference request of the set of inference requests to be distributed to each processing unit of the plurality of processing units for inference processing, the sequence parallelism mode causing the set of parameters to be distributed to each processing unit of the plurality of processing such that each processing unit receives, stores, and uses an entire set of parameters of the artificial intelligence model, the sequence parallelism mode causing different portions of each inference request of the set of inference requests to be distributed across the plurality of processing units for inference processing;

using the current parallelism mode to process the set of inference requests using the artificial intelligence model and the cache memory;

receiving, from the artificial intelligence model, a set of inference responses for the set of inference requests; and during processing of the set of inference requests and after processing a subset of tokens through early exit logic that filters tokens based on computational significance, switching between different parallelism modes of the plurality of parallelism modes within a single forward pass through the neural network model based on layer-specific computational requirements of the neural network model.

30. The machine-storage medium of claim 29, wherein the early exit logic determines computational significance based on attention weights exceeding a predetermined threshold value.

* * * * *